(12) United States Patent
Wang et al.

(10) Patent No.: US 10,305,409 B2
(45) Date of Patent: May 28, 2019

(54) HIGH-LOW-VOLTAGE CONVERSION STAR MULTI-PHASE VARIABLE-FREQUENCY DRIVE SYSTEM

(71) Applicant: Wolong Electric Group Co., Ltd., Shangyu Shaoxing, Zhejiang (CN)

(72) Inventors: Jianqiao Wang, Zhejiang (CN); Xuandong Wu, Zhejiang (CN); Chenlong Lian, Zhejiang (CN); Weican Yan, Zhejiang (CN)

(73) Assignee: WOLONG ELECTRIC GROUP CO., LTD., Zhejiang (CN)

( * ) Notice: Subject to any disclaimer, the term of this patent is extended or adjusted under 35 U.S.C. 154(b) by 0 days.

(21) Appl. No.: 15/763,250

(22) PCT Filed: Feb. 22, 2016

(86) PCT No.: PCT/CN2016/074203
§ 371 (c)(1),
(2) Date: Mar. 26, 2018

(87) PCT Pub. No.: WO2017/049859
PCT Pub. Date: Mar. 30, 2017

(65) Prior Publication Data
US 2018/0287541 A1 Oct. 4, 2018

(30) Foreign Application Priority Data
Sep. 24, 2015 (CN) .......................... 2015 1 0614440

(51) Int. Cl.
*H02P 23/12* (2006.01)
*H02P 23/28* (2016.01)
(Continued)

(52) U.S. Cl.
CPC .............. *H02P 23/28* (2016.02); *H02P 23/12* (2013.01); *H02P 25/18* (2013.01); *H02P 25/20* (2013.01);
(Continued)

(58) Field of Classification Search
CPC ...... H02P 1/00; H02P 1/24; H02P 1/26; H02P 1/42; H02P 1/426; H02P 1/46;
(Continued)

(56) References Cited

U.S. PATENT DOCUMENTS

| 7,307,361 | B1 * | 12/2007 | Bendre | ................... H01F 30/06 |
| | | | | 307/83 |
| 7,508,147 | B2 * | 3/2009 | Rastogi | ................. H02M 5/458 |
| | | | | 318/376 |
| 2014/0265972 | A1 | 9/2014 | Xu et al. | |

FOREIGN PATENT DOCUMENTS

| CN | 101252338 A | 8/2008 |
| CN | 101252339 A | 8/2008 |

(Continued)

*Primary Examiner* — Antony M Paul
(74) *Attorney, Agent, or Firm* — Muncy, Geissler, Olds & Lowe, P.C.

(57) ABSTRACT

The present invention provides a high-low-voltage conversion star multi-phase variable-frequency drive system and relates to a high-voltage high-power motor and drive control thereof. The variable-frequency drive technical solution which is commonly used at present mainly has the disadvantages that a frequency converter is added to a common motor, the insulation life of the motor is short and the heat dissipating ability of the motor is poor. The system comprises a phase-shifting transformer, rectifying circuits, inverter circuits, a multi-phase motor, and a control circuit connected with the phase-shifting transformer, the rectifying circuits, the inverter circuits and the multi-phase motor, wherein primary windings of the phase-shifting transformer are connected with an alternating-current power source, and
(Continued)

secondary windings of the phase-shifting transformer are connected with the rectifying circuits; and is characterized in that the number of the secondary windings is the same as the number of the rectifying circuits, one secondary winding is connected with one rectifying circuit, all rectifying circuits are in common-ground connection to form a common-ground direct-current power source, and output ends of the rectifying circuits are connected with the inverter circuits. By adopting the technical solution, high voltage and large currents are realized, simultaneously the structure is simple, the insulation requirement is lowered, the heat dissipating ability of the motor is improved and the power density is increased.

10 Claims, 2 Drawing Sheets

(51) Int. Cl.
　　*H02P 25/18*　　(2006.01)
　　*H02P 25/20*　　(2006.01)
　　*H02P 27/06*　　(2006.01)
　　*H02P 29/50*　　(2016.01)
　　*H02P 29/028*　　(2016.01)
(52) U.S. Cl.
　　CPC ............ *H02P 27/06* (2013.01); *H02P 29/028* (2013.01); *H02P 29/50* (2016.02)

(58) Field of Classification Search
　　CPC .... H02P 1/465; H02P 4/00; H02P 6/00; H02P 6/04; H02P 6/06; H02P 6/08; H02P 6/085; H02P 6/14; H02P 27/04; H02P 27/06; H02P 21/0032; H02P 23/0081; H02P 23/065; H02P 25/021; H02P 25/025; H02P 25/10; H02P 25/102; H02P 25/14; H02P 27/00; H02M 5/10; H02M 7/043; H02M 7/28; H02M 7/487; H02M 7/53862; H02M 2007/00; H02M 5/4505; H02M 5/4585; G05B 1/06
　　USPC .... 318/400.01, 400.02, 400.14, 400.15, 700, 318/701, 727, 779, 654, 656, 657, 658, 318/663, 800, 801, 430; 363/37, 40, 44, 363/95, 120, 175; 388/800, 808, 908
　　See application file for complete search history.

(56) References Cited

FOREIGN PATENT DOCUMENTS

| | | |
|---|---|---|
| CN | 201821184 U | 2/2009 |
| CN | 201821184 U | 5/2011 |
| CN | 105207567 A | 12/2015 |
| CN | 204906245 U | 12/2015 |

\* cited by examiner

HIGH-LOW-VOLTAGE CONVERSION STAR MULTI-PHASE VARIABLE-FREQUENCY DRIVE SYSTEM

FIELD OF THE INVENTION

The present invention relates to a high-voltage high-power motor and drive control thereof, in particular to a high-low-voltage conversion star multi-phase variable-frequency drive system, and belongs to the field of electrical motors and control thereof.

BACKGROUND OF THE INVENTION

Variable-frequency speed control of high-power motors is an important means to improve energy efficiency of motors. With the continuous progress of power electronic devices, high-power motor variable-frequency speed control systems are widely applied. Variable-frequency drive technical solutions which are commonly used at present are mainly centralized on adding a frequency converter to a common motor, do not consider a variable-frequency motor and a variable-frequency speed control system as one system architecture, and have some limitations. For example, the most commonly used drive solution is that a high-voltage three-phase motor is added with cascade high-voltage frequency converters, weaknesses thereof lie in that levels of a plurality of independent H bridges of each phase are different, insulation treatment must be performed and it is difficult to realize liquid heat dissipation and cooling; although a three-level variable-frequency speed control solution can solve the problem of common ground of power devices, due to the limitations of withstand voltage and current of power devices, high-voltage and large-current output cannot be realized; although a multi-level variable-frequency speed control solution can break through certain voltage limitations, voltage sharing technique and hardware structure are very complex; and a two-level three-phase variable-frequency speed control solution is restricted by voltage and current. On a motor side, due to the increase of power supply voltage, the requirements on insulating systems and manufacturing processes of high-voltage motors are also greatly increased, the insulation life of motors is reduced, the manufacturing process cost is increased, the heat dissipation conditions of motors become poor and the power density is decreased.

In consideration of these factors, the present invention is particularly provided to solve the above-mentioned problems.

SUMMARY OF THE INVENTION

The technical problem to be solved and the technical task to be completed by the present invention are to perfect and improve the existing technical solution and to provide a high-low-voltage conversion star multi-phase variable-frequency drive system, so as to achieve the purposes of improving the insulation life of motors and improving the heat dissipating ability of motors. Therefore, the present invention adopts the following technical solution.

A high-low-voltage conversion star multi-phase variable-frequency drive system comprises a phase-shifting transformer, rectifying circuits, inverter circuits, a multi-phase motor, and a control circuit connected with the phase-shifting transformer, the rectifying circuits, the inverter circuits and the multi-phase motor, primary windings of the phase-shifting transformer being connected with an alternating-current power source, and secondary windings of the phase-shifting transformer being connected with the rectifying circuits, and is characterized in that the number of the secondary windings is the same as the number of the rectifying circuits, one secondary winding is connected with one rectifying circuit, all rectifying circuits are in common-ground connection to form a common-ground direct-current power source, and output ends of the rectifying circuits are connected with the inverter circuits. The side, connected with a power grid side, of the system is a primary winding side of the phase-shifting transformer, the secondary windings thereof are a plurality of phase-shifting windings, and phase-shifting angles are uniformly distributed for the phase-shifting windings according to the number of phases of multi-phase frequency variation to reduce harmonic pollution to the power grid side. Through phase-shifting transformation, a high-voltage power grid can be effectively converted into a plurality of independent low-voltage three-phase alternating-current power sources, the high-low-voltage conversion of a power source system is realized, the rectifying circuits, the inverter circuits and the multi-phase motor at a rear end can be designed according to low-voltage specifications, and thus, as compared with a high-voltage motor, the insulation thickness of motor windings can be obviously reduced, the heat dissipating effect is obviously improved and the utilization rate of effective conductors in a motor stator is greatly improved. Each alternating-current power source after transformation by the phase-shifting transformer is correspondingly configured with one alternating-current rectifying circuit one to one. For the reason of phase shifting, the amplitude of voltage of each alternating-current circuit is slightly different such that direct-current voltage after rectification and filtration is also slightly different; therefore, this technical solution adopts the phase-shifting transformer and the direct-current power sources after rectification independently exist; and all rectifying circuits are in common-ground connection, the cooling structure can be simplified, the selection range of cooling modes is increased, this technical solution realizes high voltage and large current, simultaneously the structure is simple, the insulation requirement is reduced, the heat dissipating ability of the motor is improved and the power density is increased. As a further perfection and supplement to the above-mentioned technical solution, the present invention further comprises the following additional technical features.

The number of the inverter circuits is the same as the number of phases of a stator of the multi-phase motor, one inverter circuit is connected with one end of one motor stator winding and the other ends of the motor stator windings are mutually connected to form a multi-phase star winding. The motor may be an asynchronous motor or a synchronous motor, and the windings may be coils formed by using rectangular copper magnet wires or single-strand/multi-strand enamel-coated round copper magnet wires.

The number of the rectifying circuits is the same as the number of the inverter circuits and one rectifying circuit is connected with one inverter circuit; or the number of the inverter circuits is integral times of the number of the rectifying circuits, the inverter circuits are connected in parallel to form multi-phase inverter circuit parallel groups, the number of multi-phase inverters in each multi-phase inverter circuit parallel group is the same and one rectifying circuit is connected with one inverter circuit. When the phases of the motor are enough, the effect that one secondary phase-shifting winding provides power to a plurality of units can be realized and the structure of the phase-shifting transformer is simplified.

The multi-phase inverter circuits are half-bridge inverter circuits. As compared with a cascade high-voltage transformer, the number of power electronic devices used in the inverter circuits is decreased by half and the product cost can be greatly reduced; and at the same time, the number of semiconductor PN nodes in each loop is decreased from 4 to 2, the energy loss of the inverter circuit can be effectively decreased and the purpose of improving the efficiency can be achieved.

The number of the inverter circuits and the multi-phase motor stator windings is an integer greater than or equal to 5; and the number of the inverter circuits and the multi-phase motor stator windings is the same as or integral times of the number of the secondary windings of the phase-shifting transformer and the rectifying circuits.

The control circuit is provided with a communication line to perform real-time detection and drive control to the operation of the phase-shifting transformer, the rectifying circuits, the inverter circuits and the multi-phase motor to realize ordered control, feedback and adjustment.

The control circuit is provided with a human-machine interface to perform real-time observation to the operation of the phase-shifting transformer, the rectifying circuits, the inverter circuit and the multi-phase motor and to perform ordered control through adjustment of control policies. This technical solution realizes pole-changing and phase-changing operation through adjustment of control polices, and improves the speed ratio of the system without increasing the eddy-current loss of the motor.

The rectifying circuits are three-phase full-bridge rectifying circuits and perform rectification through diodes, silicon controlled rectifiers or IGBTs.

The phase-shifting transformer is a dry-type transformer or an oil immersed transformer; and the primary windings and the secondary windings of the phase-shifting transformer are connected through a star connection method, a delta connection method or a star/delta combined connection method.

The inverter circuits and the rectifying circuits have a common ground; and the inverter circuits are two-level bridge inverter circuits, three-level bridge inverter circuits or multi-level bridge inverter circuits.

Beneficial effects: 1. By connecting the phase-shifting transformer with medium-high-voltage alternating-current power sources, the system effectively reduces the pollution caused by power harmonic produced during system working to the power grid.

2. Since the rectifying circuits at the rear end of the phase-shifting transformer are common grounding lines and all power modules of the multi-phase drive circuit can realize common grounding, great convenience is brought to the structural design and thermal design of the mechanism, and the product can conveniently realize the design of the water cooling structure of the system.

3. As compared with a cascade high-voltage frequency converter, the number of power electronic devices in the inverter circuit is decreased by half and the product cost can be greatly reduced; and at the same time, the number of semiconductor PN nodes in each loop is decreased from 4 to 2, the energy loss of the inverter circuit can be effective decreased and the purpose of improving the efficiency can be achieved.

4. After the motor is designed by adopting low-voltage specifications instead of high-voltage specifications, the utilization rate of stator winding slots can be fully improved and the power density is increased; and as compared with the common motor, higher power under the situation of the same frame number or decrease of frame number under the situation of the same power can be realized, thus the amount of the used material at the same power is greatly decreased and the effects of energy saving and emission reduction are realized.

5. Since the number of phases of the motor is large, when the multi-phase motor fails due to a certain phase of the power electronic devices, the motor can still generate a rotating magnetic field such that the system can continuously operate and shutdown can be prevented from being caused.

6. For the multi-phase variable-frequency drive system which controls the asynchronous induction motor, pole-changing and phase-changing operation can be realized through adjustment of control policies and the speed ratio is improved without increasing the eddy-current loss of the motor.

DESCRIPTION OF THE EMBODIMENTS

The technical solution of the present invention will be further described below in detail with reference to the drawings.

Figure 1:
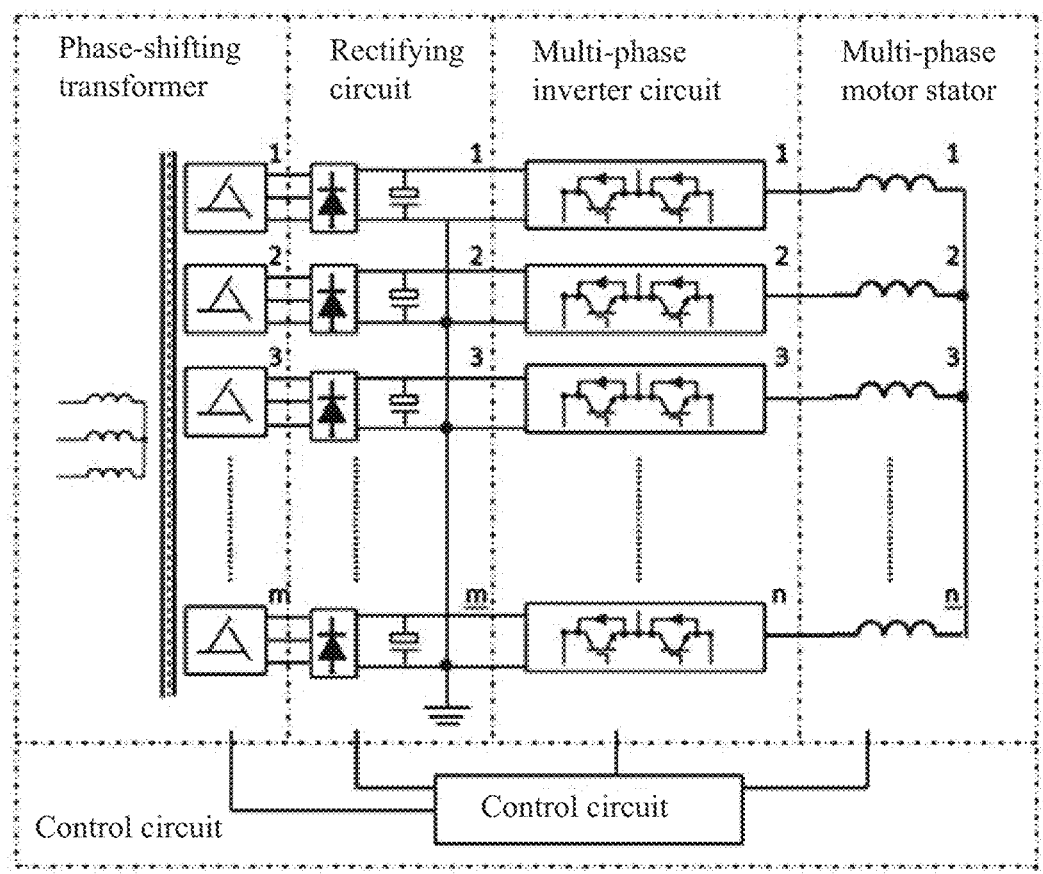
FIG. 1 illustrates one topological structural diagram according to the present invention.

Embodiment 1: as illustrated in FIG. 1, the present invention comprises a phase-shifting transformer, rectifying circuits, inverter circuits, a multi-phase motor, and a control circuit connected with the phase-shifting transformer, the rectifying circuits, the inverter circuits and the multi-phase motor, primary windings of the phase-shifting transformer are connected with an alternating-current power source, and secondary windings of the phase-shifting transformer are connected with the rectifying circuits, the number of the secondary windings is the same as the number of the rectifying circuits, one secondary winding is connected with one rectifying circuit, all rectifying circuits are in common-ground connection to form a common-ground direct-current power source, and output ends of the rectifying circuits are connected with the inverter circuits; and the number of the inverter circuits is the same as the number of phases of a stator of the multi-phase motor, one inverter circuit is connected with one end of one motor stator winding and the other ends of the motor stator windings are mutually connected to form a multi-phase star winding. The side, connected with a power grid side, of the system is a primary winding side of the phase-shifting transformer, the secondary windings thereof are a plurality of phase-shifting windings, and phase-shifting angles are uniformly distributed for the phase-shifting windings according to the number of phases of multi-phase frequency variation to reduce harmonic pollution to the power grid side; through phase-shifting transformation, a high-voltage power grid can be effectively converted into a plurality of independent low-voltage three-phase alternating-current power sources, the high-low-voltage conversion of a power source system is realized, the rectifying circuits, the inverter circuits and the multi-phase motor at a rear end can be designed according to low-voltage specifications, and thus, as compared with a high-voltage motor, the insulation thickness of motor windings can be obviously reduced, the heat dissipating effect is obviously improved and the utilization rate of effective conductors in a motor stator is greatly improved; each alternating-current power source after transformation by the phase-shifting transformer is correspondingly configured with one alternating-current rectifying circuit one to one; for the reason of phase shifting, the amplitude of voltage of each alternating-current circuit is slightly different such that direct-current voltage after rectification and filtration is also slightly different; and therefore, this technical solution adopts the phase-shifting transformer, the direct-current power sources after rectification independently exist and all rectifying circuits are in common-ground connection.

Herein, the motor may be an asynchronous motor or a synchronous motor, and the windings may be coils formed by using rectangular copper magnet wires or single-strand/multi-strand enamel-coated round copper magnet wires. The number of the rectifying circuits is the same as the number of the inverter circuits and one rectifying circuit is connected with one inverter circuit. The phase-shifting transformer is a dry-type transformer or an oil immersed transformer; and the primary windings and the secondary windings of the phase-shifting transformer are connected through a star connection method, a delta connection method or a star/delta combined connection method. The inverter circuits are two-level bridge inverter circuits, three-level bridge inverter circuits or multi-level bridge inverter circuits. The rectifying circuits are three-phase full-bridge rectifying circuits and perform rectification through diodes, silicon controlled rectifiers or IGBTs.

In order to simplify the line structure and facilitate the water cooling structure of the system, the inverter circuits and the rectifying circuits have a common ground.

In order to reduce the production cost and improve the efficiency, the multi-phase inverter circuits are half-bridge inverter circuits. The number of semiconductor PN nodes in each loop is 2, the energy loss of the inverter circuit can be effectively decreased and the purpose of improving the efficiency can be achieved.

In order to reduce the winding voltage, reduce the equipment cost and improve the working efficiency, the number of the inverter circuits and the multi-phase motor stator windings is an integer greater than or equal to 5; and the number of the inverter circuits and the multi-phase motor stator windings is the same as or integral times of the number of the secondary windings of the phase-shifting transformer and the rectifying circuits.

In order to realize control, the control circuit is provided with a communication line to perform real-time detection and drive control to the operation of the phase-shifting transformer, the rectifying circuits, the inverter circuits and the multi-phase motor to realize ordered control, feedback and adjustment. The communication line may be a wired or wireless line, and remote control can also be realized through the communication line.

In order to facilitate monitoring and adjusting system parameters, the control circuit is provided with a human-machine interface to perform real-time observation to the operation of the phase-shifting transformer, the rectifying circuits, the inverter circuit and the multi-phase motor and to perform ordered control through adjustment of control policies. The user can adjust control policies by operating the human-machine interface, pole-changing and phase-changing operation can be realized and the speed ratio of the system is improved without increasing the eddy-current loss of the motor.

Embodiment 2

Figure 2:
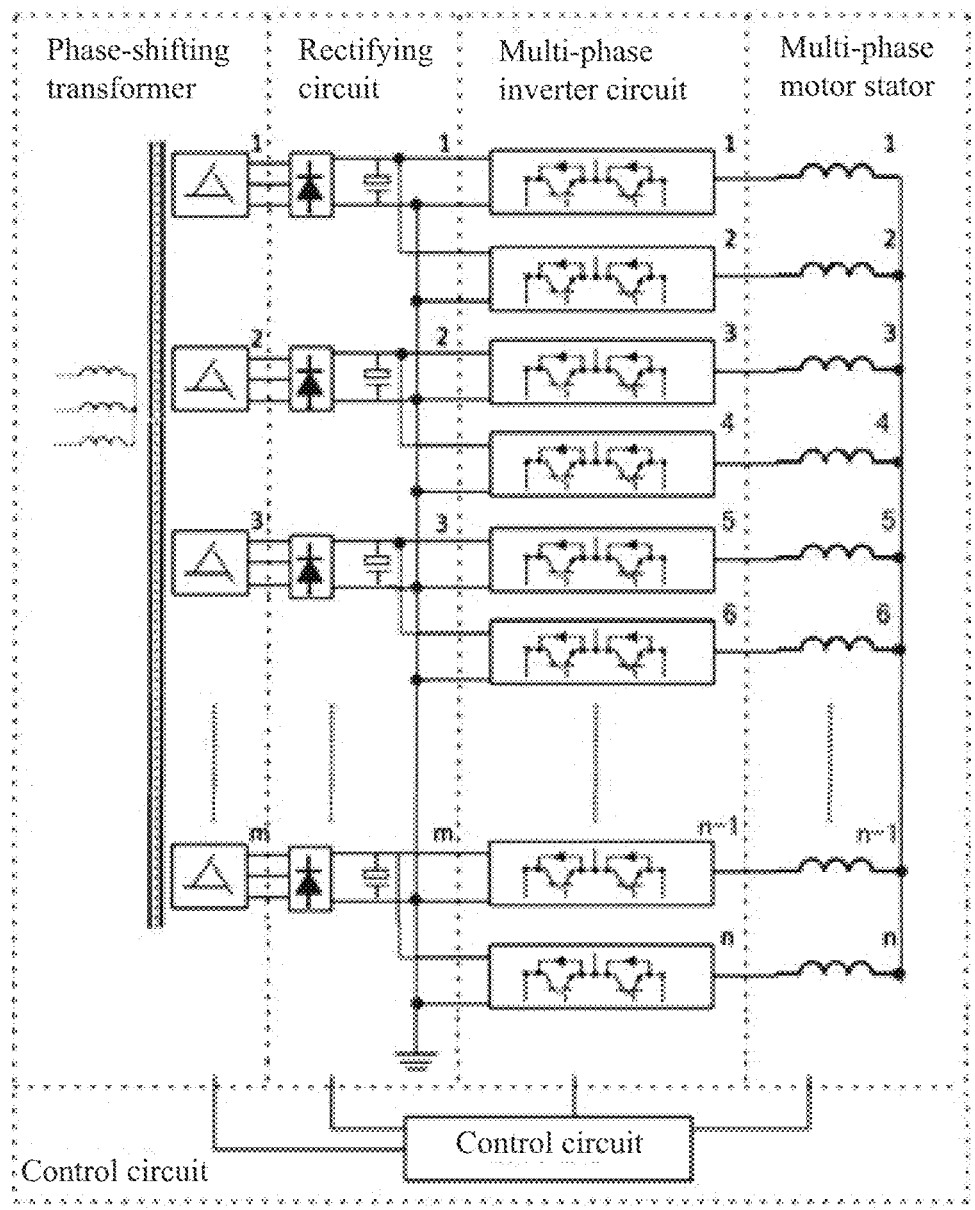
FIG. 2 illustrates another topological structural diagram according to the present invention.

Differences from embodiment 2 lie in that:

In order to simplify the structure of the phase-shifting transformer, when the phases of the motor are enough, the effect that one secondary phase-shifting winding provides power to a plurality of units can be realized; and as illustrated in FIG. 2, when the number of the inverter circuits is integral times of the number of the rectifying circuits, i.e., n/m=k (natural number), input ends of any k inverter circuits are connected in parallel to form m inverter circuit parallel groups, and an input of each inverter circuit parallel group is then connected with an output of each rectifying circuit.

The high-low-voltage conversion star multi-phase variable-frequency drive systems illustrated in FIG. 1 and FIG. 2 are specific embodiments of the present invention, the prominent substantive features and notable progress of the present invention have already been reflected, and equivalent modifications made in aspects such as shape and structure thereof according to the actual use needs under the inspiration of the present invention shall be all included in the protective scope of the present invention.

The invention claimed is:

1. A high-low-voltage conversion star multi-phase variable-frequency drive system, comprising a phase-shifting transformer, rectifying circuits, inverter circuits, a multi-phase motor, and a control circuit connected with the phase-shifting transformer, the rectifying circuits, the inverter circuits and the multi-phase motor, primary windings of the phase-shifting transformer being connected with an alternating-current power source, and secondary windings of the phase-shifting transformer being connected with the rectifying circuits, wherein the number of the secondary windings is the same as the number of the rectifying circuits, one secondary winding is connected with one rectifying circuit, all rectifying circuits are in common-ground connection to form a common-ground direct-current power source, and output ends of the rectifying circuits are connected with the inverter circuits.

2. The high-low-voltage conversion star multi-phase variable-frequency drive system according to claim 1, wherein the number of the inverter circuits is the same as the number of phases of a stator of the multi-phase motor, one inverter circuit is connected with one end of one motor stator winding and the other ends of the motor stator windings are mutually connected to form a multi-phase star winding.

3. The high-low-voltage conversion star multi-phase variable-frequency drive system according to claim 2, wherein the number of the rectifying circuits is the same as the number of the inverter circuits and one rectifying circuit is connected with one inverter circuit; or the number of the inverter circuits is integral times of the number of the rectifying circuits, the inverter circuits are connected in parallel to form multi-phase inverter circuit parallel groups, the number of multi-phase inverters in each multi-phase inverter circuit parallel group is the same and one rectifying circuit is connected with one inverter circuit.

4. The high-low-voltage conversion star multi-phase variable-frequency drive system according to claim 2, wherein the number of the inverter circuits and the multi-phase motor stator windings is an integer greater than or equal to 5; and the number of the inverter circuits and the multi-phase motor stator windings is the same as or integral times of the number of the secondary windings of the phase-shifting transformer and the rectifying circuits.

5. The high-low-voltage conversion star multi-phase variable-frequency drive system according to claim 1, wherein the multi-phase inverter circuits are half-bridge inverter circuits.

6. The high-low-voltage conversion star multi-phase variable-frequency drive system according to claim 1, wherein the control circuit is provided with a communication line to perform real-time detection and drive control to the operation of the phase-shifting transformer, the rectifying circuits, the inverter circuits and the multi-phase motor to realize ordered control, feedback and adjustment.

7. The high-low-voltage conversion star multi-phase variable-frequency drive system according to claim 6, wherein the control circuit is provided with a human-machine interface to perform real-time observation to the operation of the phase-shifting transformer, the rectifying circuits, the inverter circuit and the multi-phase motor and to perform ordered control through adjustment of control policies.

8. The high-low-voltage conversion star multi-phase variable-frequency drive system according to claim 1, wherein the rectifying circuits are three-phase full-bridge rectifying circuits and perform rectification through diodes, silicon controlled rectifiers or IGBTs.

9. The high-low-voltage conversion star multi-phase variable-frequency drive system according to claim 1, wherein the phase-shifting transformer is a dry-type transformer or an oil immersed transformer; and the primary windings and the secondary windings of the phase-shifting transformer are connected through a star connection method, a delta connection method or a star/delta combined connection method.

10. The high-low-voltage conversion star multi-phase variable-frequency drive system according to claim 1, wherein the inverter circuits and the rectifying circuits have a common ground; and the inverter circuits are two-level bridge inverter circuits, three-level bridge inverter circuits or multi-level bridge inverter circuits.

* * * * *